Sept. 18, 1956  J. M. HAYES  2,763,122
TIME AND WEATHER INDICATOR
Filed April 25, 1955  2 Sheets-Sheet 1
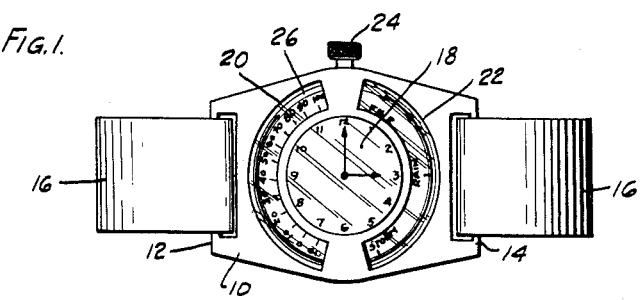
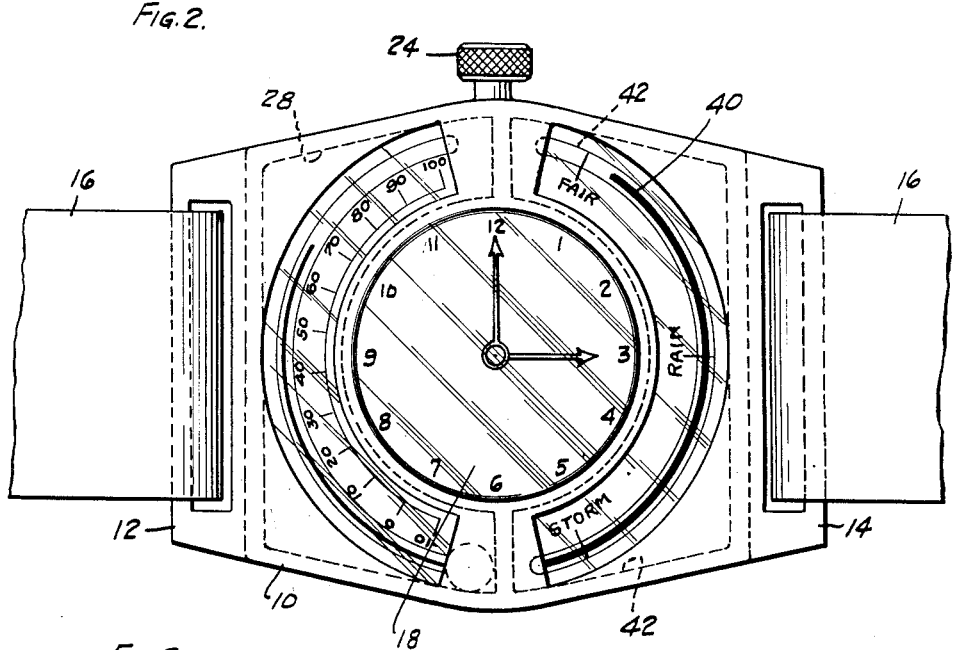
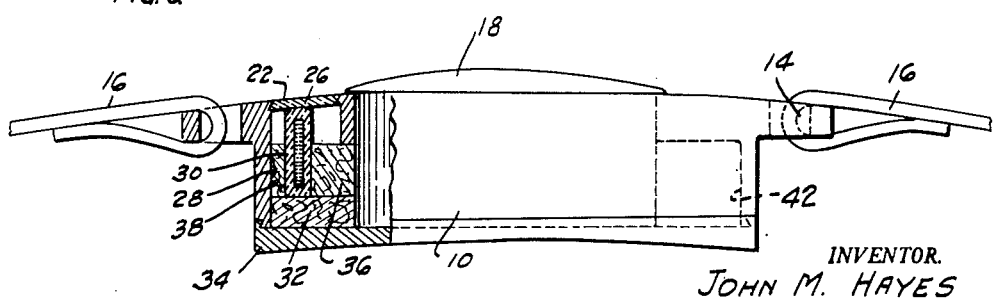
INVENTOR.
JOHN M. HAYES
BY
*Harry H. Hitzeman*
ATTORNEY.

Sept. 18, 1956 J. M. HAYES 2,763,122
TIME AND WEATHER INDICATOR
Filed April 25, 1955 2 Sheets-Sheet 2

INVENTOR.
JOHN M. HAYES
BY
Harry H. Hitzeman
ATTORNEY.

United States Patent Office 2,763,122
Patented Sept. 18, 1956

2,763,122

TIME AND WEATHER INDICATOR

John M. Hayes, Chicago, Ill.

Application April 25, 1955, Serial No. 503,412

2 Claims. (Cl. 58—88)

My invention relates to a combination time and weather indicator.

My invention relates more particularly to a time and weather indicator of the type described capable of being worn on the person, the indicator being a unitary structure so it can be carried in the pocket or worn on the wrist as an ordinary wrist watch or bracelet.

Time pieces have been devised in the past which indicate the second and minute of the hour, as well as the day of the week, the month and the year. Others are so devised that they indicate the time of the day and indicia showing what time it is in various cities or parts of the world in relation to the time here.

My invention contemplates the provision in a unitary structure of time indicating means and temperature indicating means so arranged that by a single glance both the time and temperature may be observed.

A further object of the invention is to provide in a unitary structure a combined time, temperature and barometric indicator, so arranged that the time indicator is medially disposed between the temperature and barometric indicators, the instruments being conveniently arranged and positioned in a single housing capable of attachment to the wrist of the wearer.

A further feature of the invention is the provision in a unitary housing of a triple indicator mechanism for indicating the time, the temperature and the barometric reading, all at a single glance, the temperature and barometric readings being so arranged that they are concentric with the round dial of the watch or time indicator.

For a more comprehensive understanding of the invention and the detailed construction which forms a part thereof, reference is had to the following description and the accompanying drawings, upon which Fig. 1 is an elevational view of a combination time, temperature and barometer indicator as applied to a wrist bracelet;

Fig. 2 is an enlarged view of the same with fragments of the bracelet broken;

Fig. 3 is a side elevational view thereof with a portion thereof shown in section to more clearly show other parts;

Figure 4:
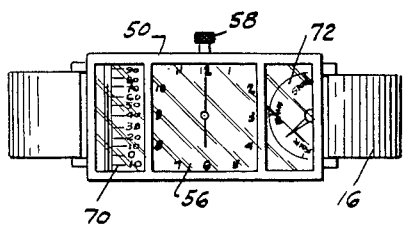
Fig. 4 is an elevational view of a modified form of the indicator as applied to a wrist bracelet.

In the embodiment of the invention which I have chosen to illustrate and describe the same, in Fig. 1 I have shown the unitary structure which may include a housing or case 10 that has a pair of brackets 12 and 14 formed thereon for the reception of the two ends of a bracelet or strap 16. On the face of the housing I have provided a watch dial 18 and a pair of concentric generally semi-cylindrical dials 20 and 22. A stem and knob 24 may be provided for winding the watch, as is usual. The dial 20 may have a scale 26 therebeneath to indicate temperature, which runs from —10° F. to 100° F. Below the scale 26 in a compartment 28 in the housing 10 I have provided a thermometer 30 which may be of a size so that it fits in a vertical position between a resilient backing 32 positioned against the housing cover 34 and the dial 20 on the face of the unit. I also provide resilient supports 36 and 38 on both sides of the thermometer so that it is at all times resiliently supported in the housing 10.

The dial 22 may overlie an indicator 40 which has a mercury tube 42 therebeneath, the mercury tube forming part of a small barometer which is positioned in the same way as the thermometer 30 in a similar chamber 42 in the housing 10. The dial may have the indicia "Fair," "Rain," and "Storm" in appropriate locations upon the same, so that as the barometric pressure falls or rises, the wearer may tell at a glance the type of weather which may be encountered.

From the above and foregoing description it can be seen that I have provided in a single unitarian housing a combined time, temperature and weather indicator, so constructed and arranged that it can be worn either as a wrist watch or as a pocket piece that may be carried on the person.

Figure 5:
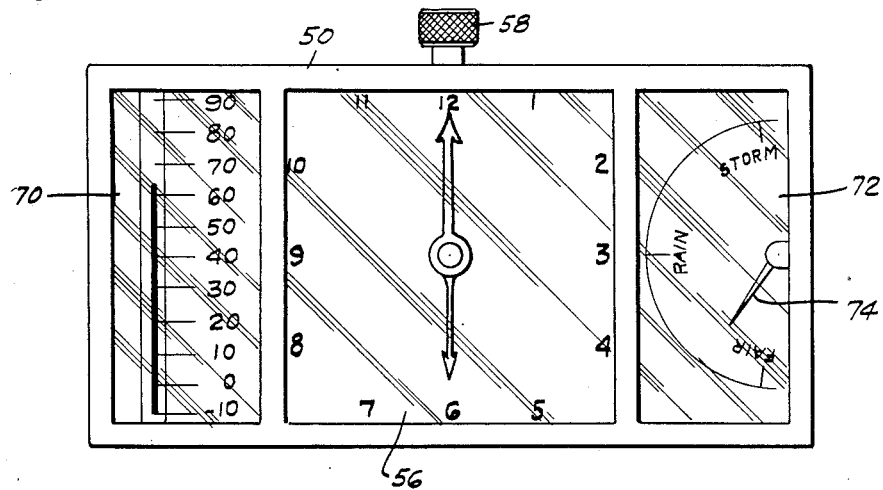
Fig. 5 is an enlarged elevational view of the unitary member.
Figure 6:
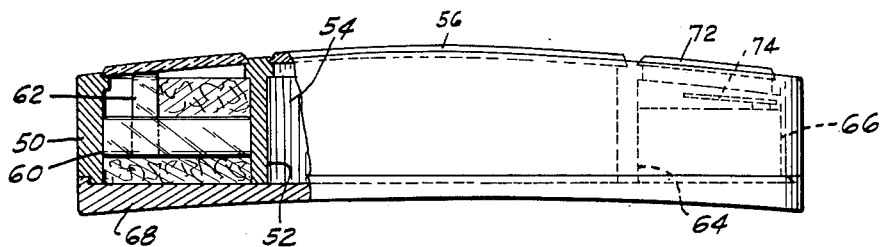
Fig. 6 is a side elevational view thereof with parts broken in section to more clearly show other parts.

In the embodiment of the invention shown in Figs. 4 to 6 inclusive, I have shown a housing 50 which may have a central compartment 52 for the reception of a watch 54, the watch being provided with the usual dial 56, stem and winder 58. The housing 50 is provided with three compartments or chambers, the chamber 52 for the watch portion, the chamber 60 for a thermometer 62, and the chamber 64 for a barometer 66. The back of the housing 50 may be enclosed by a cover plate 68 which when open permits access to all three of the chambers mentioned.

The thermometer 62 may be located below a transparent dial 70 which has a scale ranging from —10° F. to 90 or 100° F. inscribed on the lower surface of the same and in a straight line. Thus when the temperature rises or falls, affecting the mercury in the tube, it will indicate at all times the prevailing temperature. The barometer 66 may be located in the compartment 64 as described, below a transparent dial 72 which has the indicia "Fair," "Rain" and "Storm" imprinted on the inner face of the same. The barometer shown in the disclosure may be an aneroid barometer of the usual type which includes a metal 74 that is responsive to the rise and fall of atmospheric pressure. The metal is so arranged together with its motivating force that it swings in an arc from high to low pressure corresponding to the insignia on the dial which has been provided.

It can thus be seen that in the disclosure herein set forth, two types of barometric constructions have been provided together with two types of housings and dial arrangements. In the one form shown, the dials and indicators will be concentric with the face and dial of the watch, and in the other modification shown the temperature and weather indicating instruments will be aligned upon opposite sides of the dial of the watch.

While I have illustrated and described a specific embodiment of the invention, it will be apparent to those skilled in the art that changes and modifications may be made in the exact details shown and I do not wish to be limited in any particular; rather what I desire to secure and protect by Letters Patent of the United States is:

1. A combination time and weather indicator comprising a housing having a middle compartment and equal compartments on opposite sides of the same, each of said compartments having dials on the face of the same, a time indicator in said middle compartment, a temperature indicator in one of said side compartments and a weather indictor in the other of said compartments, said temperature and weather indicators having dials concentric with the time indicator dial.

2. A combination time and weather indicator comprising a housing having a middle compartment and equal compartments on opposite sides of the same, each of said compartments having dials on the face of the same, a time indicator in said middle compartment, a temperature indicator in one of said side compartments and a weather indicator in the other of said compartments, said temperature and weather indicators having dials concentric with the time indicator dial, said temperature indicator and weather indicator each being mounted in resilient supports on both sides of the same in their compartments.

References Cited in the file of this patent

UNITED STATES PATENTS

| 370,400 | McLean | Sept. 27, 1887 |
| 2,716,327 | Franklin et al. | Aug. 30, 1955 |

FOREIGN PATENTS

| 22,703 | Switzerland | Oct. 29, 1900 |
| 864,904 | France | Feb. 3, 1941 |